United States Patent
Pohl et al.

(10) Patent No.: US 11,021,612 B2
(45) Date of Patent: Jun. 1, 2021

(54) BASE COATS AND METHODS OF USING AND PRODUCING THE SAME

(71) Applicant: AXALTA COATING SYSTEMS IP CO., LLC, Wilmington, DE (US)

(72) Inventors: Mark P. Pohl, Dearborn, MI (US); Eric Calhoun, Wyandotte, MI (US); Robert E. Pennock, Glenolden, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 54 days.

(21) Appl. No.: 16/117,501

(22) Filed: Aug. 30, 2018

(65) Prior Publication Data
US 2020/0071536 A1    Mar. 5, 2020

(51) Int. Cl.
| | | |
|---|---|---|
| *C09D 5/00* | (2006.01) | |
| *C09D 7/65* | (2018.01) | |
| *C09D 7/20* | (2018.01) | |
| *B05D 7/00* | (2006.01) | |
| *B05D 3/10* | (2006.01) | |

(52) U.S. Cl.
CPC .............. *C09D 5/002* (2013.01); *B05D 3/108* (2013.01); *B05D 7/536* (2013.01); *C09D 7/20* (2018.01); *C09D 7/65* (2018.01)

(58) Field of Classification Search
CPC ....................................................... C09D 7/80
See application file for complete search history.

(56) References Cited

U.S. PATENT DOCUMENTS

| | | | | |
|---|---|---|---|---|
| 4,725,640 A | * | 2/1988 | Cowles | B23K 9/04 524/439 |
| 2008/0152927 A1 | * | 6/2008 | Noguchi | C09D 151/06 428/423.1 |

OTHER PUBLICATIONS

Chlorinated Polyolefin—343-1, EASTMAN (Year: 2020).*
Acid Modified Chlorinated Polyolefin, Nippon Paper Group (Year: 2020).*
Eastman Chemical Company, How to use Eastman CPOs as Adhesion Promoters, 2013.
Eastman Chemical Company, Eastman Solventborne Adhesion Promoters for Difficult-to-Adhere-to Substrates, 2014.
Element'S Specialties, Resins and Additives for Plastic Coating, Dec. 2015.
U.S. Paint Corporation, Direct to Plastic (DTP) Basecoats, undated prior art.

* cited by examiner

*Primary Examiner* — Wenwen Cai
(74) *Attorney, Agent, or Firm* — Lorenz & Kopf, LLP

(57) ABSTRACT

Base coats, methods of using base coats, and methods of producing base coats are provided. In an exemplary embodiment, a method of producing a base coat includes forming a CPO intermediate and a color intermediate. The CPO intermediate includes a chlorinated polyolefin at from about 5 to about 20 weight percent, based on a total weight of the CPO intermediate, as well as a CPO solvent. The color intermediate includes a color imparting additive and a color solvent that is different than the CPO solvent. The CPO intermediate and the color intermediate are combined to form the base coat, where the base coat includes from about 1 to about 3 weight percent chlorinated polyolefin and from about 5 to about 30 weight percent solids, based on a total weight of the base coat.

19 Claims, 2 Drawing Sheets

BASE COATS AND METHODS OF USING AND PRODUCING THE SAME

TECHNICAL FIELD

The present disclosure generally relates to base coats and methods of using and producing the same, and more particularly relates to base coats that can be directly applied to polymeric substrates without a primer layer, and methods of using and producing the same.

BACKGROUND

Manufacturers typically paint motor vehicles during the manufacturing process, where some of the motor vehicle components primarily include thermoplastic polyolefins, polypropylene, or other polymers. For example, many bumper components of modern motor vehicles are formed from thermoplastic polyolefin containing materials, and other components may be formed of polypropylene. Several layers of different coatings are typically utilized to coat these substrates. A primer layer (sometimes referred to as an adhesion layer) is deposited directly to a surface of the polymer, and one or more base coats are deposited overlying the primer layer. The primer layer improves adhesion of the base coat, and the base coat provides the desired color and a protective polymeric matrix. A clear coat is often applied overlying the base coat to provide additional protection and to improve the overall appearance.

Painting is a time and energy intensive process that includes many steps, where each step requires time and has a cost for the materials and the labor. Naturally, the more layers that are applied, the greater the time and cost required.

Accordingly, it is desirable to develop base coats that do not require a primer or adhesion coat, methods of coating objects without a primer or adhesion coat, and methods of producing such base coats. In addition, it is desirable to develop base coats that can be directly applied to thermoplastic polyolefin substrates, methods of producing such coatings, and methods of coating such substrates. Furthermore, other desirable features and characteristics of the present embodiment will become apparent from the subsequent detailed description and the appended claims, taken in conjunction with the accompanying drawing and this background.

BRIEF SUMMARY

Base coats, methods of using base coats, and methods of producing base coats are provided. In an exemplary embodiment, a method of producing a base coat includes forming a CPO intermediate and a color intermediate. The CPO intermediate includes a chlorinated polyolefin at from about 5 to about 20 weight percent, based on a total weight of the CPO intermediate, as well as a CPO solvent. The color intermediate includes a color imparting additive and a color solvent that is different than the CPO solvent. The CPO intermediate and the color intermediate are combined to form the base coat, where the base coat includes from about 1 to about 3 weight percent chlorinated polyolefin and from about 5 to about 30 weight percent solids, based on a total weight of the base coat.

A base coat is provided in another embodiment. The base coat includes a chlorinated polyolefin at from about 1 to about 3 weight percent, a coating resin at from about 5 to about 25 weight percent, and a color imparting additive at from about 2 to about 25 weight percent, all based on a total weight of the base coat. The base coat has solids of from about 10 to about 30 weight percent.

A method coating a substrate is provided in yet another embodiment. The method includes forming a CPO intermediate that includes a chlorinated polyolefin at from about 5 to about 20 weight percent, based on a total weight of the CPO intermediate, as well as a CPO solvent. A color intermediate is formed that includes a color imparting additive and a color solvent that is different than the CPO solvent. The CPO intermediate and the color intermediate are combined to form a base coat, where the base coat includes from about 1 to about 3 weight percent chlorinated polyolefin and from about 5 to about 30 weight percent solids, based on a total weight of the base coat. The base coat is applied over the substrate such that the base coat directly contacts the substrate, where the substrate primarily includes polyolefin. The base coat is then cured to form a cured coating layer in direct contact with the substrate.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
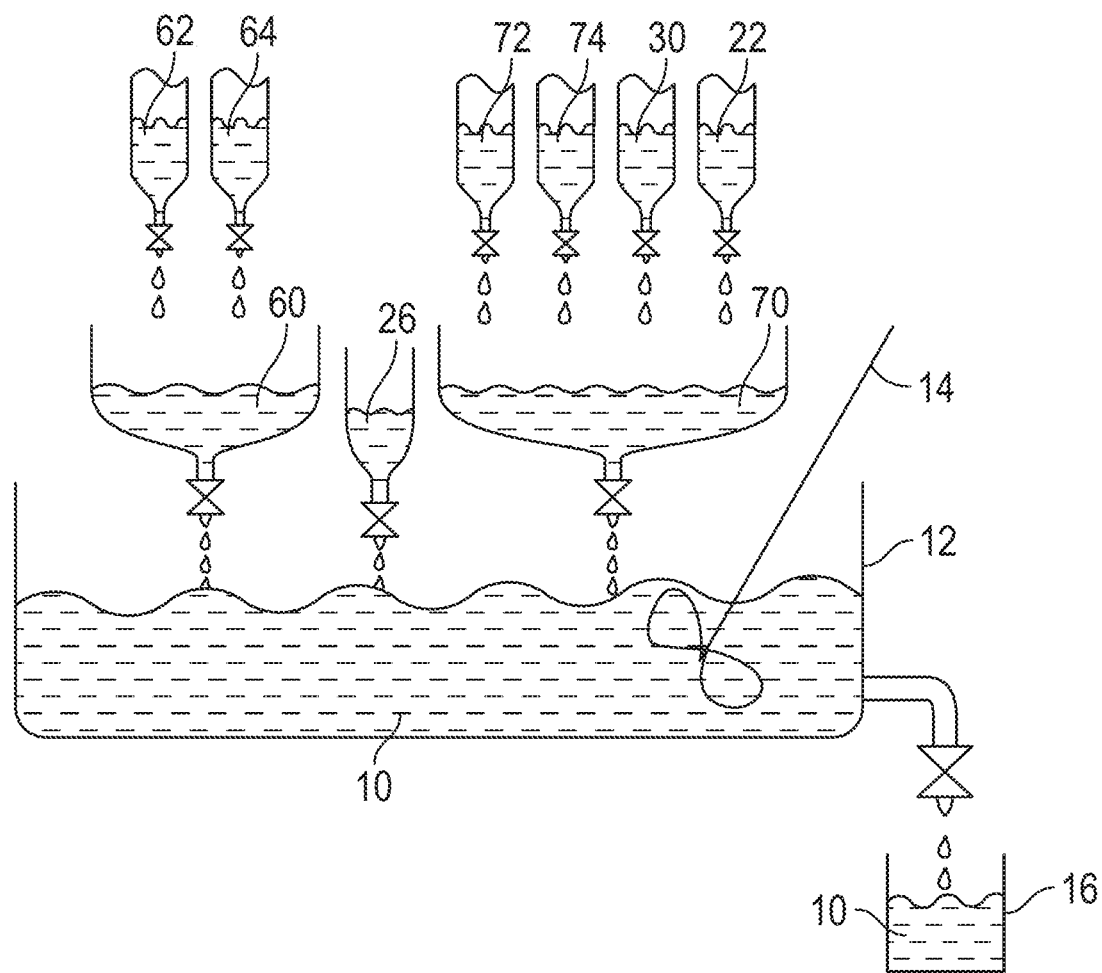
FIG. 1 is a schematic diagram of a mixing and packaging system and operation.

The following detailed description is merely exemplary in nature and is not intended to limit the application or uses of the embodiment described. Furthermore, there is no intention to be bound by any theory presented in the preceding technical field, background, brief summary, or the following detailed description.

Many articles include polymeric substrates, such as automobile parts, helmets, frames, etc. In general, coatings such as paint have poor adhesion to some polymers. Many coatings have poor adhesion to thermoplastic polyolefins and polypropylene in particular, because thermoplastic polyolefins and polypropylene have low surface energy. Therefore, a primer layer is typically laid down over such substrates prior to a base coat, where the primer helps adhere the base coat. In some embodiments, the primer layer includes chlorinated polyolefins to aid in adhering to the substrate, and the base coat includes a different polymer. Chlorinated polyolefins are relatively soft, so a harder polymer is included in the base coat to provide superior protection for the substrate. Chlorinated polyolefins are non-polar and have limited solubility in many solvents.

The solvents suitable for chlorinated polyolefins are typically not suitable for pigments or other color imparting additives and other typical coating materials, so chlorinated polyolefins are not incorporated into a base coat that includes a color imparting additive and a coating resin. Because of this, the chlorinated polyolefins and the base coat polymer and color imparting additive are typically applied in separate layers (i.e., a primer layer and a base coat layer). It has been discovered that chlorinated polyolefins, color imparting additives, and coating resins can be combined in one base coat without separation or other incompatibility failures if the proper solvents and formulation steps are utilized. As such, a base coat that includes chlorinated polyolefins, color imparting additives, and coating resins can be applied directly to a polymeric substrate, such as a substrate primarily including thermoplastic polyolefins. In general, the chlorinated polyolefins are incorporated into a first CPO solvent in a CPO intermediate, while the color imparting additive is incorporated into a second color solvent in a color intermediate, where the color solvent is different than the CPO solvent. Once the color imparting additive and chlorinated polyolefin are incorporated into the respective solvents, they can be successfully combined as long as the solids of the resulting base coat remain low and the total concentration of chlorinated polyolefins in the resulting base coat is low.

As used herein, a constituent that "includes" a compound includes that compound at from about 1 to about 100 weight percent, based on a total weight of the constituent, unless otherwise specified. Further, a constituent that "primarily includes" a compound includes that compound at from about 50 to about 100 weight percent, based on the total weight of the constituent.

Reference is made to FIG. 1. A CPO intermediate 60 and a color intermediate 70 are produced, and the CPO intermediate 60 and color intermediate 70 are combined to produce a base coat 10. The term "base coat" 10 as used herein, refers to a liquid formulation of a coating prior to being cured. The base coat 10 is mixed, such as with a mixer 14, to combine the various components. The base coat 10 is mixed in a vessel 12, where the vessel 12 may be a tank, a pipe, a mixing tube, or a wide variety of shapes that are capable of containing a liquid. In a similar manner, the mixer 14 may be an agitator, a static mixer, or a wide variety of components that are capable of mixing the various components. Once the components within the vessel 12 are mixed to produce the base coat 10, the base coat 10 may be packaged for distribution in one or more containers 16. The container 16 may be a can, a bottle, a tote bin, or almost any container 16 capable of holding a liquid.

The CPO intermediate 60 includes a chlorinated polyolefin 62 and a CPO solvent 64. The chlorinated polyolefin 62 may be introduced to the CPO intermediate 60 as a solid powder or as a liquid in an organic solvent. In an exemplary embodiment, the chlorinated polyolefin 62 includes chlorine at from about 15 to about 45 weight percent, based on a total weight of the chlorinated polyolefin 62 (not including any solvent the chlorinated polyolefin 62 may be dissolved in). In other embodiments, the chlorinated polyolefin 62 includes chlorine at from about 18 to about 30 weight percent, or from about 20 to about 25 weight percent, all based on the total weight of the chlorinated polyolefin 62.

Several different embodiments of the chlorinated polyolefin 62 are possible. For example, the chlorinated polyolefin 62 may be anhydride modified, including maleic anhydride modified. In alternate embodiments, the chlorinated polyolefin 62 is modified to include acrylic moieties, carboxylic moieties, hydroxyl moieties, etc. However, in some embodiments the chlorinated polyolefin 62 is not modified to include other functional groups.

The chlorinated polyolefin 62 is incorporated into the CPO solvent 64 in the CPO intermediate 60, and in some embodiments the chlorinated polyolefin 62 is dissolved in the CPO solvent 64. However, in alternate embodiments, the chlorinated polyolefin 62 is dispersed into the CPO solvent 64. In all embodiments, the chlorinated polyolefin 62 forms a stable compound in the CPO intermediate 60, where a "stable compound," as used herein, means a solution or mixture that does not separate, coagulate, or settle within 48 hours when held without mixing at 25 degrees Celsius (° C.) and at 1 atmosphere of pressure. In some embodiments, the CPO intermediate 60 is a stable solution, where a "stable solution" is a stable compound that is a solution as opposed to a dispersion or emulsion.

The chlorinated polyolefin is stable in a limited number of solvents, so the CPO solvent 64 is selected with care. In general, the CPO solvent 64 is an organic solvent. In an exemplary embodiment, the CPO solvent 64 is selected from butyl acetate, methyl ethyl ketone, cyclohexane, methyl amyl ketone, aromatic compounds having from 6 to 10 carbon atoms (including xylene), and combinations thereof. The chlorinated polyolefin 62 is incorporated into the CPO solvent 64 in limited quantities so as to produce a stable CPO intermediate 60. Chlorinated polyolefins 62 at concentrations of greater than about 20 weight percent are generally not stable in the CPO solvent 64, based on a total weight of the CPO intermediate. In an exemplary embodiment, the CPO intermediate 60 includes chlorinated polyolefins 62 at a concentration of from about 5 to about 20 weight percent, based on the total weight of the CPO intermediate 60, but in an alternate embodiment the CPO intermediate 60 includes chlorinated polyolefin 62 at a concentration of from about 5 to about 10 weight percent, based on the total weight of the CPO intermediate 60. The CPO intermediate 60 may be mixed or blended to incorporate the chlorinated polyolefin 62 into the CPO solvent 64. In some embodiments, additional components may also be included in the CPO intermediate 60, such as additives or other materials as discussed below.

The color intermediate 70 includes a color imparting additive 72 and a color solvent 74. The color imparting additive 72 imparts color in the color intermediate 70 and in the base coat 10. The color imparting additive 72 may be a dye, a pigment, another component that imparts a desired color, or a combination thereof, where the color imparting additive 72 is used to color the base coat 10. Typical color imparting additives 72 that can be used include filler pigments such as talc, china clay, barytes, carbonates, silicates, and color pigment including metallic oxides such as titanium dioxide, zinc oxide and iron oxides of various colors. Other color imparting additives 72 that may be used include, but are not limited to, carbon black and organic colored pigments and dyes. Exemplary colored pigments and dyes include quinacridones, copper phthalocyanines, perylenes, azo pigments, indanthrone blues, carbazoles such as carbazole violet, isoindolinones, isoindolines, thioindigo reds, and benzimidazolinones. Metallic flake pigments, such as aluminum flakes, mica flakes, pearlescent flakes, or a combination thereof may also be used. The color imparting additive 72 may optionally include an effect pigment to impart a special visual effect such as sparkle, pearlescent, luminescent, and/or metallic appearance or an increased depth of color to the cured coating composition. The color intermediate 70 includes the color imparting additive 72 at a concentration of from about 3 to about 60 weight percent, based on a total weight of the color intermediate 70.

The color intermediate 70 also includes the color solvent 74, where the color solvent 74 is different than the CPO solvent 64. The color solvent 74 is selected to form a stable compound with the color imparting additive 72, where the color imparting additive 72 is typically dispersed within the color solvent 74. However, in alternate embodiments the color imparting additive 72 is dissolved or emulsified within the color solvent 74 such that the color intermediate 70 is a stable compound. The color solvent 74 may vary with different color imparting additives 72, where the properties of each color imparting additive 72 influence the selection of the color solvent 74. In an exemplary embodiment, the color solvent 74 is selected from methyl acetate, butyl acetate, acetone, heptane, aromatic hydrocarbons, and combinations thereof. The color intermediate 70 may include other additives or components in various embodiments as well, as discussed below.

The CPO additive 60 and the color additive 70 are combined such that the chlorinated polyolefins 62 are present in the base coat 10 at a concentration of from about 1 to about 3 weight percent, based on a total weight of the base coat 10. The relative proportions of the CPO additive 60 and the color additive 70 are determined such that the base coat 10 has the desired concentration of chlorinated polyolefins 62 and other components.

The base coat 10 also includes a coating resin 22 at from about 5 to about 25 weight percent in an exemplary embodiment, based on the total weight of the base coat 10. However, in alternate embodiments the base coat 10 includes the coating resin 22 at from about 10 to about 20 weight percent, or from about 15 to about 20 weight percent, all based on the total weight of the base coat 10. The coating resin 22 is a polymer, and may be a relatively hard polymer to protect underlying substrates. In an exemplary embodiment, the coating resin 22 is added to the color intermediate 70 prior to mixing the color intermediate 70 and the CPO intermediate 60. However, in alternate embodiments (not illustrated), the coating resin 22 may be added to the CPO intermediate 60 prior to mixing of the color intermediate 70 and the CPO intermediate 60, or the coating resin 22 may be added to the base coat independently from either the CPO intermediate 60 or the color intermediate 70. In general, all of the components described herein, other than (1) the chlorinated polyolefin 62, (2) the CPO solvent 64, (3) the color imparting additive 72, and (4) the color solvent 74 may be introduced to the base coat 10 either in the CPO intermediate 60, the color intermediate 70, or independent of either the CPO intermediate and the color intermediate. FIG. 1 illustrates various components being added to the color intermediate 70, but this is representative of only one of many possible different techniques for adding the various components.

In some embodiments, the coating resin 22 comprises a polymer that includes a crosslinkable component, where the crosslinkable component crosslinks in the presence of a crosslinking component. The crosslinking component may be added to the crosslinkable component soon before the base coat 10 is applied, where the base coat 10 has a "pot life" once the crosslinkable and crosslinking components are mixed together. In this disclosure, the term "binder" refers to the crosslinkable component and the crosslinking component, and all other optional film-forming components. The binder generally includes all the film-forming components that contribute to the solid organic portion of the cured composition. "Crosslinkable component" means a component that has functional groups appended thereon that are capable of reacting with the crosslinking component to form a crosslinked network. The crosslinkable component may comprise a compound, oligomer, polymer, or a combination thereof having at least one functional group reactive with the crosslinking component. The functional groups in the crosslinkable component can be chosen from hydroxy, amino, hydroxy silane, alkoxysilane, epoxy, carbamate, carboxy, anhydride, acetoacetate, cyclic carbonate, acrylate, azide, thiol, or other functional groups, including combinations thereof.

"Crosslinking component" means a component that is capable of reacting with the functional groups on the crosslinkable component to form a crosslinked network. The crosslinking component can be chosen from the group of melamine, amino resin, ketimine resin, polyisocyanate, blocked polyisocyanate, or other functional groups, including combinations thereof. The crosslinking component may be added to the base coat 10 in a crosslinking catalyst part soon before application of the base coat 10 to a substrate, described more fully below. Generally, from about 0.1 to about 8 weight percent, based on the weight of the binder, of crosslinking catalyst is used, but the amount of crosslinking catalyst and the type of crosslinking catalyst depends on the type of coating resin 22 employed. Several different crosslinking catalysts may be used in alternate embodiments. Some exemplary catalysts include tin catalysts such as dibutyl tin dilaurate and dibutyl tin diacetate, tertiary amines, bismuth, zinc salts, blocked acid catalysts, zirconium acetylacetonate, or other catalyst. One example of a blocked acid catalyst is an aromatic sulfonic acid blocked with amino methyl propanol or dimethyl oxazoline. Typically useful aromatic sulfonic acids are para toluene sulfonic acid, dodecyl benzene sulfonic acid, and decyl benzene sulfonic acid, but other aromatic sulfonic acids may also be utilized in alternate embodiments. One preferred catalyst is dodecyl benzene sulfonic acid blocked with amino methyl propanol.

In alternate embodiments, the coating resin 22 is a non-catalyzed resin. As such, the base coat 10 cures by solvent evaporation, and crosslinking is limited or not present. In some cases, the non-catalyzed resin does crosslink on curing, such as by reacting with oxygen in the atmosphere. Exemplary non-catalyzed resins include acrylic resins and alkyd resins, but other non-catalyzed resins may also be utilized.

The coating resin 22 may include a wide variety of polymer types, such as acrylic resins, urethane resins, polyester resins, alkyd resins, epoxy resins, polyurea polyols, cellulose acetate butyrate resins, melamine resins, or combinations thereof. In some embodiments, the coating resin 22 is selected from urethane resins, acrylic resins, polyester resins, or combinations thereof. In some embodiments, the coating resin 22 has a weight average molecular weight of from about 15,000 to about 70,000, but other average molecular weights may be utilized in alternate embodiments. Generally, catalysts, color imparting additives 72 such as pigments, and non-polymeric chemical additives such as stabilizers described hereinafter are not considered part of the binder. Non-binder components other than color imparting additives usually do not amount to more than about 5-15% by weight of the base coat 10, but other concentration ranges are possible in some embodiments.

The term "solids," as used herein, refers to the non-volatile portions of the base coat 10 that remain after curing, and after the solvents (including but not limited to the CPO solvent 64 and the color solvent 74) have evaporated. In an exemplary embodiment, the base coat 10 is formulated such that the base coat 10 includes from about 5 to about 30 weight percent solids, or from about 10 to about 30 weight percent solids in an alternate embodiment. The remaining portion of the base coat 10 is solvents or other volatile components that evaporate or dissipate on curing.

A base coat solvent 26 other than the CPO solvent 64 and the color solvent 74 may be added to the base coat 10 independent of the CPO additive 60 and the color additive 70 in some embodiments. Any solvent added to the CPO additive 60 is included in the CPO solvent 64 in this description, and any solvent added to the color additive 70 is included in the color solvent 74 in this description. In many embodiments, the base coat solvent 26 is an organic solvent, and water may be present in the base coat 10 at a concentration of about 1 weight percent or less, based on the total weight of the base coat 10. Representative base coat solvents 26 that may optionally be utilized include cyclohexane, methyl amyl ketone, and mixtures of dialkyl and trialkyl benzenes with 9 to 10 carbons. Other organic solvents that may be utilized include, but are not limited to: aromatic hydrocarbons, such as aromatic petroleum naphtha or xylenes; ketones, such as, methyl propyl ketone, methyl isobutyl ketone, methyl ethyl ketone or acetone; esters, such as butyl acetate or hexyl acetate; glycol ether esters, such as propylene glycol monomethyl ether acetate; and combinations thereof.

In addition to the above ingredients, the composition may also include other formulation additives 30 such as toughening agents and flow control agents, for example, such as Resiflow® S (polybutylacrylate), and BYK® 320 and 325 (high molecular weight polyacrylates). Such additional formulation additives 30 will, of course, depend on the desired final properties of the base coat 10, as will be apparent to those skilled in the art. In addition, the formulation additives 30 may include rheologically active agents, such as Garamite® clay, fumed silica, urea or other types of sag control agents, and the like. Other formulation additives 30 that may be added include ultraviolet light stabilizers, surfactants, fillers, etc. Any one or more of the listed formulation additives 30 or other formulation additives 30 not specifically mentioned herein may be included in the base coat 10 at from about 0 to about 25 weight percent in total, based on the total weight of the base coat 10.

Figure 2:
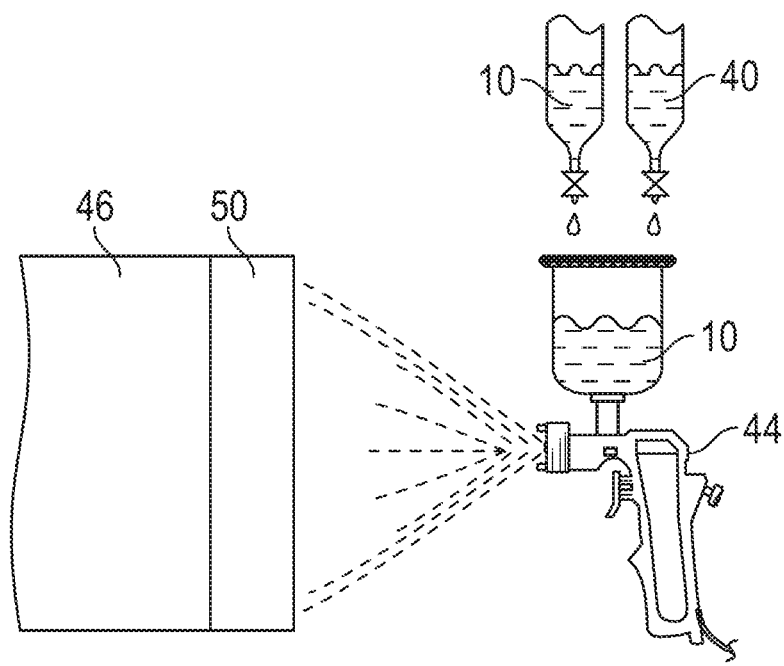
FIGS. 2 and 3 illustrate coating a substrate.

Reference is made to an exemplary embodiment in FIG. 2, with continuing reference to FIG. 1. The base coat 10 and an optional crosslinking catalyst part 40 are combined and applied to a substrate 46 with an application device 44. The crosslinking catalyst part 40 is only utilized in embodiments where the coating resin 22 of the base coat 10 includes a crosslinking component. The crosslinking catalyst part 40 may also include solvents, formulation additives, or other components in exemplary embodiments. In the illustrated embodiment, the application device 44 is a spray gun, but in alternate embodiments the application device 44 may be brush, a dip tank, a roller, high speed rotational electrostatic bells, or other devices capable of applying the base coat 10 to the substrate 46. In an exemplary embodiment, the base coat 10 directly contacts the substrate 46, such that there is no primer layer between the base coat 10 and the substrate 46.

The substrate 46 primarily includes a polymer in an exemplary embodiment, where the polymer may include a polyolefin, and in some embodiments the substrate 46 primarily includes a polyolefin. Polypropylene is one example of a polyolefin, but other polyolefins are utilized in alternate embodiments. In some embodiments, the substrate 46 may include acrylonitrile butadiene styrenes, cellulose acetate butyrates, carbon nitrides, ethylene propylenes, melamine formaldehydes, polyamides, polyamides, polycarbonates, polyethyelenes, polybutylene terephthalates, polyethylene terephthalates, polythiophenes, poly(methyl methacrylates), polyoxymethylenes, polypropylenes, poly(phenylene oxides), photoluminescence polymers, polyvinyl chlorides, styrene acrylonitriles, nylons, benzimidazobenzophenanthrolines, polyesters and reinforced polyesters, polyurethanes and thermoplastic polyurethanes, and other polymers. The substrate 46 may be a component of an automobile in some embodiments, but the substrate 46 may be another article in alternate embodiments.

The base coat 10 is cured after being applied to the substrate to produce the cured coating layer 50. In an exemplary embodiment as described above, the base coat 10, prior to curing, is applied directly to a face of the substrate 46, so the cured coating layer 50 (after curing) directly contacts the substrate 46. The cured coating layer 50 includes the coating resin 22, which is crosslinked on curing in some embodiments, as well as the color imparting additive 72 and the chlorinated polyolefin 62. The solvent, including the CPO solvent 64, the color solvent 74, and the optional base coat solvent 26, may be removed during the curing process, such as by evaporation. The cured coating layer 50 may be from about 0.2 to about 3.0 mils thick in an exemplary embodiment, but in alternate embodiments the cured coating layer 50 may be from about 0.5 to about 2.5 mils thick, or from about 0.5 to about 1.5 mils thick.

Figure 3:
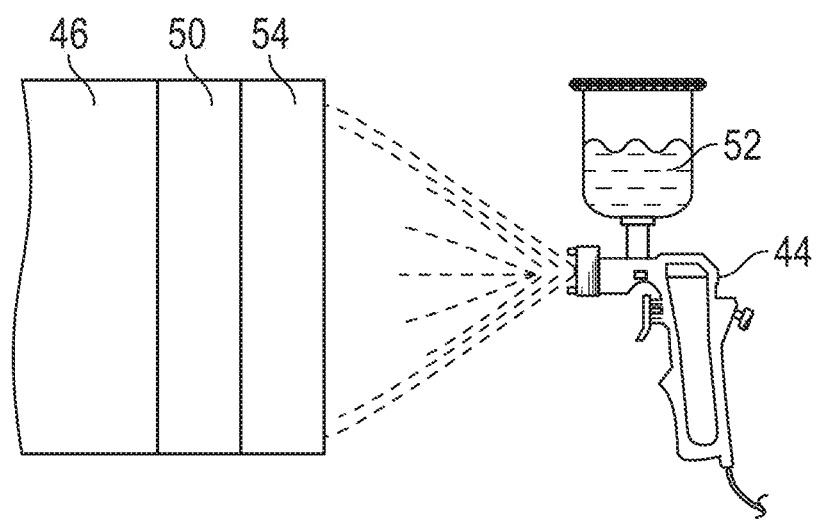

A clearcoat 52 may optionally be applied overlying the cured coating layer 50, as illustrated in an exemplary embodiment in FIG. 3 with continuing reference to FIGS. 1 and 2. The clearcoat 52 is then cured to form a cured clearcoat 54. A wide variety of clearcoats 52 may be employed, and the clearcoat 52 is typically selected based on the type of coating resin 22 within the base coat 10. The clearcoat 52 may be applied before or after the base coat 10 is cured in various embodiments. For example, the base coat 10 may be coated with the clearcoat 52 or with a second layer of the base coat 10 or with other coatings while wet, or after flash drying of the base coat 10 but before complete curing, or after curing. The cured clearcoat 54 may be from about 0.5 to about 4.0 mils thick in an exemplary embodiment, but in alternate embodiments the cured clearcoat 54 may be about 1.0 to about 3.0 mils thick, or from about 1.5 to about 2.5 mils thick.

The cured coating layer 50 and/or the cured clearcoat 54 may be cured by the passage of time, where the solvent is allowed to evaporate and the optional crosslinkable component and the optional crosslinking component are allowed to react and produce a crosslinked network. However, in alternate embodiments the cured coating layer 50 and/or the cured clearcoat 54 may be cured by baking, such as at a temperature of from about 25 degrees Celsius (° C.) to about 120° C., or by infrared irradiation, or by other techniques. The curing process for the cured coating layer 50 may be independent from the curing process for the cured clearcoat 54 in some embodiments, but in other embodiments the cured coating layer 50 and the cured clearcoat 54 are cured simultaneously.

The cured clearcoat layer 54 provides a durable, high gloss appearance to the substrate 46, and protects the cured coating layer 50. In an exemplary embodiment, the clearcoat 52 is a solvent borne material including a film forming binder, and the clearcoat 52 may include a crosslinking agent. As such, a crosslinkable component and a crosslinking component of the clearcoat 52 may be combined shortly before application. The term "solvent borne" means the liquid carrier of a composition includes water at about 1 percent or less by weight, based on the total amount of liquid carrier. The film forming binder of the clearcoat 52 is referred to as the clearcoat binder in this description. In an exemplary embodiment, the clearcoat binder is about 40-70 weight percent of the clearcoat 52, and a volatile organic solvent is about 30-60 weight percent of the clearcoat composition, where the organic solvent typically volatilizes at about 35 degrees centigrade (° C.) to about 100° C. or more. The clearcoat 52 may also include other formulation additives 30 as discussed above, which may be the same or different than in the base coat 10. The clearcoat binder may be in solution or in a dispersion in the organic solvent. Alternate embodiments of the clearcoat 52 are also possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A method of producing a base coat comprising:
    forming a CPO intermediate comprising a CPO solvent and a chlorinated polyolefin, wherein the CPO intermediate comprises from about 5 to about 20 weight percent of the chlorinated polyolefin, based on a total weight of the CPO intermediate, and wherein the CPO solvent comprises one or more of methyl amyl ketone and butyl acetate;
    forming a color intermediate comprising a color imparting additive and a color solvent, wherein the color solvent is different from the CPO solvent, and wherein the color solvent comprises acetone;
    combining the CPO intermediate with the color intermediate to form the base coat, wherein the base coat comprises from about 1 to about 3 weight percent of the chlorinated polyolefin, based on a total weight of the base coat, and wherein the base coat comprises solids at from about 5 to about 30 weight percent, based on the total weight of the base coat.

2. The method of claim 1 wherein forming the CPO intermediate comprises forming the CPO intermediate with from about 5 to about 10 weight percent of the chlorinated polyolefin.

3. The method of claim 1 wherein the base coat further comprises a coating resin.

4. The method of claim 3 wherein:
    the color intermediate comprises the coating resin.

5. The method of claim 3 wherein:
    the coating resin comprises a crosslinkable component.

6. The method of claim 5 further comprising:
    forming a crosslinking catalyst part, wherein the crosslinking catalyst part comprises a crosslinking component configured to crosslink the crosslinkable component of the coating resin; and
    combining the crosslinking catalyst part with the base coat.

7. The method of claim 3 wherein:
    the coating resin is selected from the group consisting of a urethane resin, an acrylic resin, a polyester resin, and combinations thereof.

8. The method of claim 1 wherein:
    the CPO solvent comprises methyl amyl ketone.

9. The method of claim 1 wherein the CPO solvent comprises butyl acetate.

10. The method of claim 1 wherein the base coat comprises solids at from about 10 to about 30 weight percent, based on the total weight of the base coat.

11. The method of claim 1 wherein:
    the chlorinated polyolefin comprises maleic anhydride modified chlorinated polyolefins.

12. The method of claim 1 wherein:
    forming the CPO intermediate comprises dissolving the chlorinated polyolefin in the CPO solvent.

13. The method of claim 12 wherein:
    forming the color intermediate comprises dispersing the color imparting additive in the color solvent.

14. The method of claim 1 wherein:
    the chlorinated polyolefin comprises chlorine at from at from about 15 to about 45 weight percent based on a total weight of the chlorinated polyolefin.

15. A method of coating a substrate comprising:
    forming a CPO intermediate comprising a CPO solvent and a chlorinated polyolefin, wherein the CPO intermediate comprises from about 5 to 20 weight percent of the chlorinated polyolefin, based on a total weight of the CPO intermediate, and wherein the CPO solvent comprises one or more of butyl acetate and methyl amyl ketone;
    forming a color intermediate comprising a color imparting additive and a color solvent, wherein the color solvent is different from the CPO solvent, and wherein the color solvent comprises acetone;
    combining the CPO intermediate with the color intermediate to form a base coat, wherein the base coat includes the chlorinated polyolefin at from about 1 to about 3 weight percent, based on a total weight of the base coat, and wherein the base coat comprises solids at from about 5 to about 30 weight percent, based on the total weight of the base coat.
    applying the base coat over the substrate such that the base coat directly contacts the substrate, wherein the substrate primarily comprises polyolefin; and
    curing the base coat to form a cured coating layer in direct contact with the substrate.

16. The method of claim 15 further comprising:
    applying a clearcoat overlying the cured coating layer; and
    curing the clearcoat to form a cured clearcoat.

17. The method of claim 16, wherein
    the basecoat further comprises a coating resin, wherein the coating resin comprises a crosslinkable component; and
    the method further comprising:
    forming a crosslinking catalyst part, wherein the crosslinking catalyst part comprises a corsslinking component configured to crosslink with the crosslinkable component of the coating resin; and
    combining the crosslinking catalyst part with the base coat prior to applying the combined crosslinking catalyst part and base coat over the substrate.

18. The method of claim 15 wherein:
    the chlorinated polyolefin comprises chlorine at from about 15 to about 45 weight percent based on a total weight of the chlorinated polyolefin.

19. The method of claim 15 wherein:
    the CPO intermediate comprises the chlorinated polyolefin at from about 5 to about 10 weight percent, based on the total weight of the CPO intermediate.

* * * * *